(12) United States Patent
Deng et al.

(10) Patent No.: US 6,711,553 B1
(45) Date of Patent: Mar. 23, 2004

(54) METHOD AND APPARATUS FOR DIGITAL CONTENT COPY PROTECTION

(75) Inventors: Huijie Robert Deng, Singapore (SG); Yong Dong Wu, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 541 days.

(21) Appl. No.: 09/588,448

(22) Filed: Jun. 6, 2000

(30) Foreign Application Priority Data

Feb. 25, 2000 (SG) .................................. 200001029-8

(51) Int. Cl.[7] .............................................. G06F 17/60
(52) U.S. Cl. ........................................ 705/57; 705/51
(58) Field of Search ........................ 705/50–51, 57–59; 380/200–203, 229, 284–285; 713/160–161, 171, 202

(56) References Cited

U.S. PATENT DOCUMENTS

| | | | |
|---|---|---|---|
| 4,866,769 A | 9/1989 | Karp | 380/4 |
| 4,903,296 A | 2/1990 | Chandra et al. | 380/4 |
| 5,513,260 A | 4/1996 | Ryan | 380/3 |
| 5,604,801 A * | 2/1997 | Dolan et al. | 380/21 |
| 5,935,246 A | 8/1999 | Benson | 713/200 |
| 6,006,190 A * | 12/1999 | Baena-Arnaiz et al. | 705/1 |
| 6,052,780 A * | 4/2000 | Glover | 713/193 |
| 6,195,432 B1 * | 2/2001 | Takahashi et al. | 380/9 |
| 6,301,660 B1 * | 10/2001 | Benson | 713/165 |
| 6,367,019 B1 * | 4/2002 | Ansell et al. | 713/201 |
| 6,385,596 B1 * | 5/2002 | Wiser et al. | 705/51 |
| 6,398,245 B1 * | 6/2002 | Gruse et al. | 280/228 |

FOREIGN PATENT DOCUMENTS

| | | | |
|---|---|---|---|
| EP | 0 665 486 A2 | 8/1995 | |
| EP | 0 717 564 A2 * | 6/1996 | ......... H04N/5/913 |
| WO | WO 98/42098 | 9/1998 | |
| WO | WO 99/55055 | 10/1999 | |

OTHER PUBLICATIONS

AlChemedia's Mirage to be Used by Nintendo to Secure Company, PR Newswire, Dec. 17, 2001.*
Handbook Chapter, "Handbook of Applied Cryptography," Menezes et al., CRC Press, 1996, pp. 1–34.
Article, "Net Security—Private Communication in a Public World", Kaufman et al., PTR Prentice Hall, Englewood Cliffs, New Jersey, 1995, pp. 39–56.

* cited by examiner

Primary Examiner—James P. Trammell
Assistant Examiner—Mary Cheung
(74) Attorney, Agent, or Firm—Brinks Hofer Gilson & Lione

(57) ABSTRACT

A method, apparatus and a computer program product are described for copy protecting encrypted documents in a client-server system using an unsecured communication channel. The client-server system has clients and a server for storing encrypted documents. Encrypted documents $e(K_s, M)$ are received by a client from the server. Communications on a transmission channel between the client and the server are then authenticated. Such communications also include electronic payments initiated by a user using the client. Upon authenticating or payment, an encrypted document can then be decrypted. After decrypting, the unencrypted document is displayed but prevented from storage at any client unless re-encrypted using a host specific key $K_H$ associated with the client to thereby provide a re-encrypted document.

30 Claims, 6 Drawing Sheets

METHOD AND APPARATUS FOR DIGITAL CONTENT COPY PROTECTION

FIELD OF THE INVENTION

The present invention relates to electronic copy protection of digital documents, and in particular, to protection of digital documents against unauthorised copying and access.

BACKGROUND

With the rapid growth of the Internet and multimedia technology, distribution of digital content, hereafter referred to as digital documents, is pervasive. Such digital documents include text, software programs, graphics, video or audio in digital formats. Unlike non-digital documents, digital documents can be copied and disseminated easily without any degradation in quality. Obviously, a market in which digital documents are easily copied because of inadequate copy protection adversely affects commerce including consumer interests. Hence, security of digital documents is critical to ensure a commercially stable environment.

Conventionally, the security of digital documents involves using a cryptographic system to prevent unauthorised copying of such documents. A cryptographic system, or cryptosystem, has an encryption key to convert plaintext into ciphertext and a decryption key to recover the plaintext from the ciphertext. If the encryption key and the decryption key are identical, the cryptosystem is called a symmetric key cryptosystem. If the encryption key and the decryption key are different and determining the decryption key from the encryption key is computationally infeasible, the cryptosystem is called an asymmetric key cryptosystem or public key cryptosystem. In a public key cryptosystem, anyone can encrypt a message using the public encryption key. However, only the holder of the corresponding private decryption key can decrypt the ciphertext and recover the message.

Another common aspect of digital document security is the use of digital signatures, which is an electronic analogy of hand-written signatures. In a digital signature scheme, a user has a private signature key, or private key and a public verification key, or public key. Only the holder of the private key can generate a valid digital signature on a message, but anyone with the corresponding public key can verify the validity of the digital signature. In a public key cryptosystem or digital signature scheme, it is often important to securely bind a public key with the legitimate user's ID. Such a binding can be achieved using the public key certificates, which contain at least the user's identity, his/her public key, and a validity time interval, and are digitally signed by a certification authority.

A one-way hash function ( ) has the properties that:
1) for any message m, the hash h(m) is easy to compute;
2) given h(m), finding m is computationally infeasible; and
3) finding two messages that have the same hash is also computationally infeasible For more information on cryptosystems, digital signature scheme, one-way hash functions, and public key certificates, reference is made to A. Menezes, P. Oorschot, and S. Vanstone, *Handbook of Applied Cryptography*, CRC Press, 1996, or C. Kaufman, R. Perlman, and M. Speciner, *Network Security—Private Communication in A Public World*, PTR Prentice Hall, Englewood Cliffs, N.J., 1995.

U.S. Pat. No. 5,935,246 describes a method of copy protection for protecting software against copying with a challenge mechanism embedded in each protected item of software. In operation, the challenge mechanism sends a random challenge to the customer's signature server. The signature server signs the challenge using the customer's private key and then returns the signed challenge to the challenge mechanism. The challenge mechanism then verifies the signed challenge, using the customer's public key, and prohibits the customer from using some or all of the protected item of software unless the verification is successful. However, U.S. Pat. No. 5,935,246 uses a public key cryptosystem that requires each user to have a private key and public key pair. Hence, disadvantageously, anyone with knowledge of a legitimate user's private key can access and run protected software entitled to the legitimate user.

U.S. Pat. No. 5,513,260 describes a method for copyright protection for various recording media such as compact discs (CDs). Coupled with the combination of symmetric and asymmetrical encrypting methods, an authentication signature is recorded on the media only when copy protection is required. The nature of this signature is such that the signature is not transferred to illicit copies made on CD recorders. When an original protected disk is played, the presence of the signature causes the player to correctly decrypt the program data. However, when a copy of a protected CD is played, the absence of the signature causes the player to generate false data, which prohibits the disk from playing normally. However, the copy protection scheme in U.S. Pat. No. 5,513,260 requires modification to CD players and such modification undesirably adds to the costs of such CD players.

U.S. Pat. No. 4,903,296 describes copy protection of software on magnetic medium with a special key having two marks made on the surface of the magnetic medium. These two marks are in the form of absence of material and domains that cannot be formed by conventional magnetic disk write heads. Additionally, an encrypted key, which is critical for running the application, is built into a special purpose hardware subsystem. Hence, software or computer systems need the hardware subsystem to apply the copy protection technique of U.S. Pat. No. 4,903,296. Unfortunately, this makes copy protection as described in U.S. Pat. No. 4,903,296 less flexible for adapting to existing software or computer systems.

U.S. Pat. No. 4,866,769 describes a method of copy protection of personal computer software distribution in diskettes through the use of a unique identification stored in read-only-memory of personal computers. A source ID is provided with every software distributed. A personal computer ID is used with the source ID of a distribution diskette to produce an encoded check word using an encryption method. This check word is then used to verify that the software is being used on a designated personal computer. However, U.S. Pat. No. 4,866,769 is also not flexible in copy protection as a separate and different copy of a software is required for each personal computer.

WO9842098 describes a technique of digital rights management in which a digital product is encrypted and freely distributed through uncontrolled channels. Security fragment(s) of the encrypted digital product are withheld and provided only upon communication with a license server. A customer uses a reader software to purchase a license. Such reader software examines components of a reader system to develop a reader system signature. Using the reader system signature, the license server encrypts a product decryption key and the security fragment(s). The product decryption key and the security fragment(s) are then provided to the reader system. When the customer wishes to use the digital product, a new reader system signature is generated to decrypt the digital product. However, the technique as described in WO9842098 requires personal information of a client to be provided to the license server and some users may not be comfortable disclosing such personal information. Furthermore, the license server encrypts documents only upon transmission of such documents to a client. Consequently, documents stored in the license server are not encrypted and, hence, can be fraudulently accessed by unauthorised users.

SUMMARY

According to one aspect of the invention, there is provided a method for copy protecting encrypted documents in a client-server system using an unsecured communication channel, the client-server system having at least one client and at least one server for storing encrypted documents, the method including the steps of:

- receiving an encrypted document from the server by a client;
- authenticating communications between the client and the server;
- decrypting by the client the encrypted document using a decryption key when the step of authenticating is successful to derive a decrypted document;
- preventing storage of the decrypted document on a storage device at any of the at least one client;
- in response to a user request at the client to save the decrypted document, encrypting the decrypted document with a host specific key associated with the client to provide a re-encrypted document; and
- saving the re-encrypted document in a storage device of the client.

According to another aspect of the invention, there is provided an apparatus for copy protecting encrypted documents in a client-server system using an unsecured communication channel, the client-server system having at least one client and at least one server for storing encrypted documents, the apparatus including:

- means for receiving an encrypted document from the server by a client;
- means for authenticating communications between the client and the server;
- means for decrypting by the client the encrypted document using a decryption key when the step of authenticating is successful to derive a decrypted document;
- means for preventing storage of the decrypted document on a storage device at any of the at least one client;
- means for encrypting the decrypted document with a host specific key associated with the client to provide a re-encrypted document; and
- means for saving the re-encrypted document in a storage device of the client.

According to a further aspect of the invention, there is provided a computer program product having a computer usable medium having a computer readable program code means embodied therein for copy protecting encrypted documents in a client-server system using an unsecured communication channel, the client-server system having at least one client and at least one server for storing encrypted documents, the computer program product including:

- a computer readable program code module for receiving an encrypted document from the server by a client;
- a computer readable program code module for authenticating communications between the client and the server;
- a computer readable program code module for decrypting by the client the encrypted document using a decryption key when the step of authenticating is successful to derive a decrypted document;
- a computer readable program code module for preventing storage of the decrypted document on a storage device at any of the at least one client;
- a computer readable program code module for encrypting the decrypted document with a host specific key associated with the client to provide a re-encrypted document; and
- a computer readable program code module for saving the re-encrypted document in a storage device of the client.

BRIEF DESCRIPTION OF THE DRAWINGS

Embodiments of the invention are described hereinafter with reference to the drawings, in which.

DETAILED DESCRIPTION

A method, an apparatus and a computer program product are described for copy protecting encrypted documents in a client-server system using an unsecured communication channel. In the following description, numerous details are set forth including, for example, specific content-addressing techniques like hashing. It will be apparent to one skilled in the art, however, that the present invention may be practiced without these specific details. In other instances, well-known features are not described in detail so as not to obscure the present invention.

The embodiments of the invention provide a client-server system in which a digital plain text document is encrypted before being saved in a client. A host specific key $K_H$ associated with the client is used to encrypt the digital plain text document. This is an advantage compared to prior art client-server systems in that storage of a digital document by a client is prevented unless that document has been encrypted. Another advantage in using the host specific key $K_H$ of one client for encryption as such is that any digital document copied and transferred to another client cannot be decrypted by the latter for lack of the host specific key $K_H$ of the former.

In this detailed description of the preferred embodiment of the invention, the following notation is used throughout:

e(K, M): encryption of message M with key K and a symmetric key cryptosystem;

h(X|Y): a cryptographic one-way hash function with input "X|Y",
  where X|Y represents the concatenation of message X and Y.

Also, some components of the system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Figure 1:
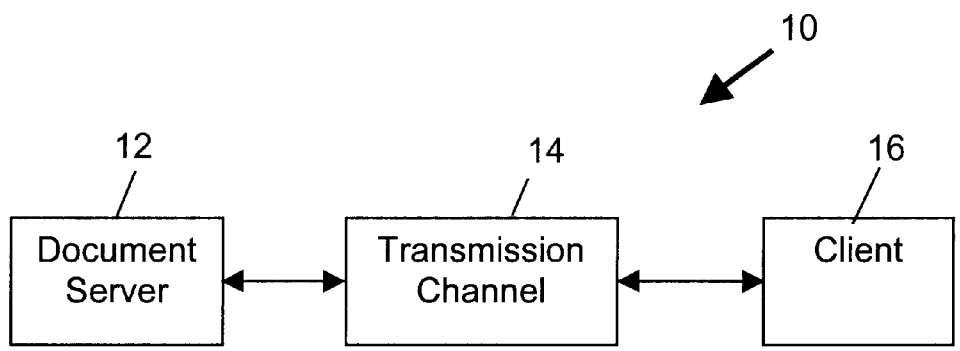
FIG. 1 is a block diagram illustrating a client-server system with a server, a client and a transmission channel there between in accordance with a preferred embodiment of the invention.

A block diagram of a client-server system 10 for digital document dissemination is illustrated in FIG. 1. A server 12 refers to a document server that provides all types of digital documents including but not restricted in form to text, graphics, video, audio, software or any combination thereof. A transmission channel 14 represents the media through which information is delivered to a client 16. The transmission channel 14 includes but is not limited to any communication module or media such as computer networks, radio frequency (RF) channels, satellite links, diskettes or other storage media.

Without loss of generality, the server 12 is assumed to publish digital documents through a World Wide Web (WWW) server and the client 16 runs a web browser. However, the method and apparatus according to the embodiments of the present invention can be realised by those skilled in the art through means other than web servers and web browsers.

Figure 2:
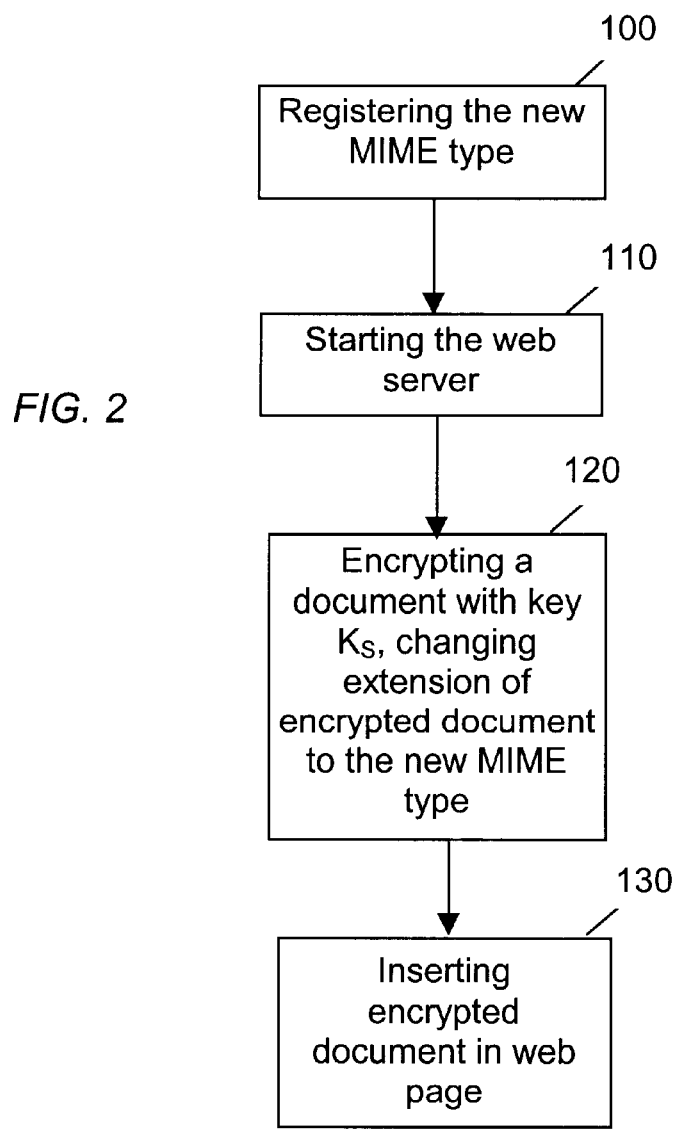
FIG. 2 is a flowchart of the operation of the server of FIG. 1 when preparing documents.

FIG. 2 is a flowchart of the operation of the server 12 in preparing and publishing documents in the illustrative embodiment of the present invention. All the file names of copy protected documents have an extension field corresponding to a newly defined Multipurpose Internet Mail Extensions (MIME) type (see N. Borenstein and N. Freed, "Multipurpose Internet Mail Extensions", IETF RFC 1341, June 1992). At step 100, the new MIME type is registered to the server 12, such as, for example, a web server. This web server, hosting web pages that point to copy protected documents, is then started at 110. At step 120, operations of the web server when preparing a copy-protected document takes place. First, a plaintext document M is encrypted using a secret key KS and a symmetric key cryptosystem to produce an encrypted document $e(K_S, M)$. The encrypted document is given a file name with an extension field corresponding to the new MIME type registered at step 100. Finally, the encrypted document is inserted into a web page (e.g., a URL) and made available to access by legitimate clients in 130. Steps 120 and 130 may be repeated to add more documents.

Figure 3:
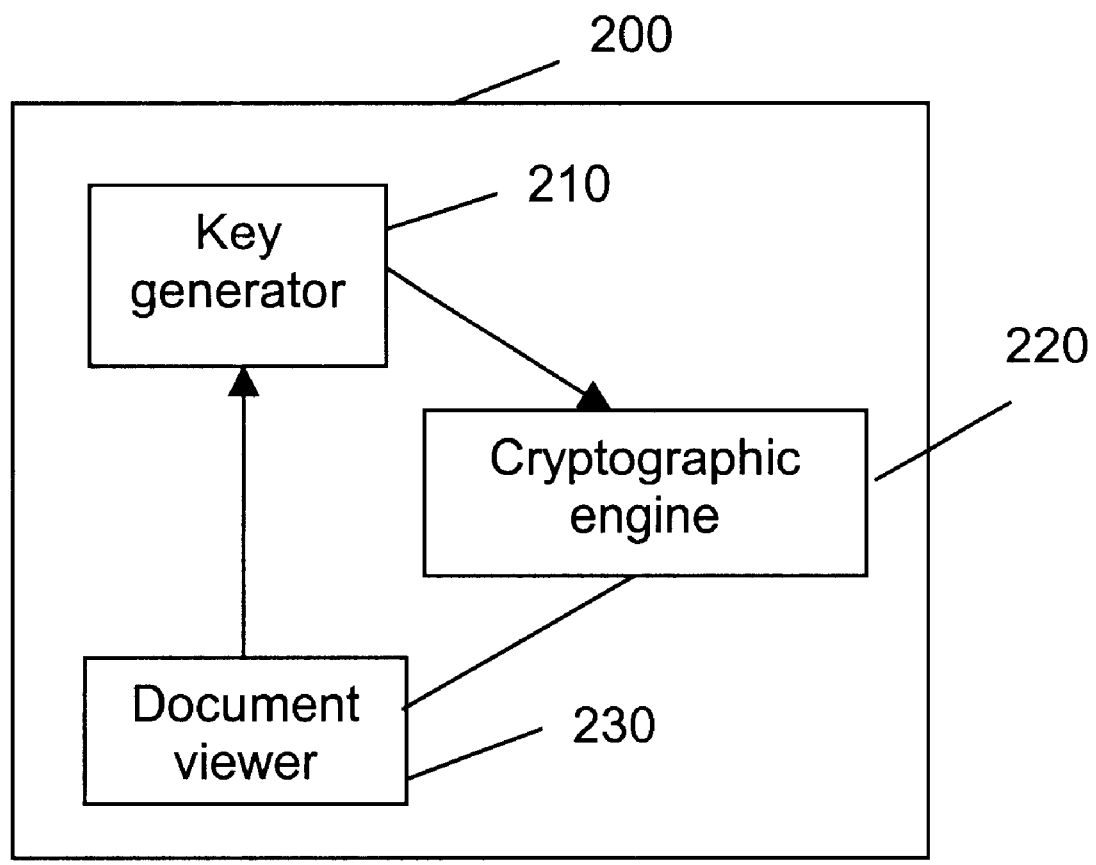
FIG. 3 is a block diagram showing components of a Copy Protection Document Reader (CPDR) module within the client of FIG. 1.

FIG. 3 is a block diagram showing components of a Copy Protection Document Reader (CPDR) module 200. The CPDR module 200 runs in the client 16 as a stand-alone application or as a plug-in application in the web browser of the client 16. The CPDR module 200 is a specially designed module used to view and to protect copy-protected documents downloaded from the server 12. The CPDR module 200 comprises a key generator 210, a cryptographic engine 220 and a document viewer 230.

The key generator 210 generates a host specific key $K_H$ from a secret value Reader_Secret embedded in the CPDR module 200 and from unique host identification information Host_ID (such as the IP address, operating system series number or the Ethernet address of the client 16). Every time $K_H$ is generated, the key generator 210 reads Host_ID from the client 16, computes $K_H$ from Reader_Secret and Host_ID using, for example, a one-way hash function:

$$K_H = h(\text{Reader\_Secret}|\text{Host\_ID})$$

The key generator 210 erases Host_ID and $K_H$ from memory as soon as these parameters are no longer in use.

The key generator 230 holds the secret key $K_S$ used to encrypt documents at the server 12 and a challenge secret key $K_C$ used to challenge and to authenticate the server 12. For security reasons, the keys $K_S$, $K_C$, and the secret value Reader_Secret should never be released outside of the process domain of the CPDR module 200. The keys $K_S$ and $K_C$ are shared between the server 12 and the CPDR module 200, while Reader_Secret is a value local to the particular CPDR module 200 of the client 16.

The cryptographic engine 220 is a cryptographic library performing symmetric key encryption, decryption and hash function operations. The document viewer 230 facilitates viewing, protecting and saving documents with an extension type corresponding to the new MIME type registered at step 100. Integrity of the CPDR module 200 is protected by the operating system of the client 16.

The document viewer 230 is a generic term as applied here and is a viewer for text or word documents, a video player for video content, an audio player for audio content or a combination thereof for multimedia content. Likewise, the term "view" and "display" are also generic terms and can refer to "playback" for audio or video content.

The above assumes that the document server 12 and the CPDR module 200 are applied in a symmetric key cryptosystem for encryption and authentication. For persons skilled in the art, it is known that part or all of such a symmetric key cryptosystem can be replaced by a public key cryptosystem or a digital signature security scheme.

Figure 4:
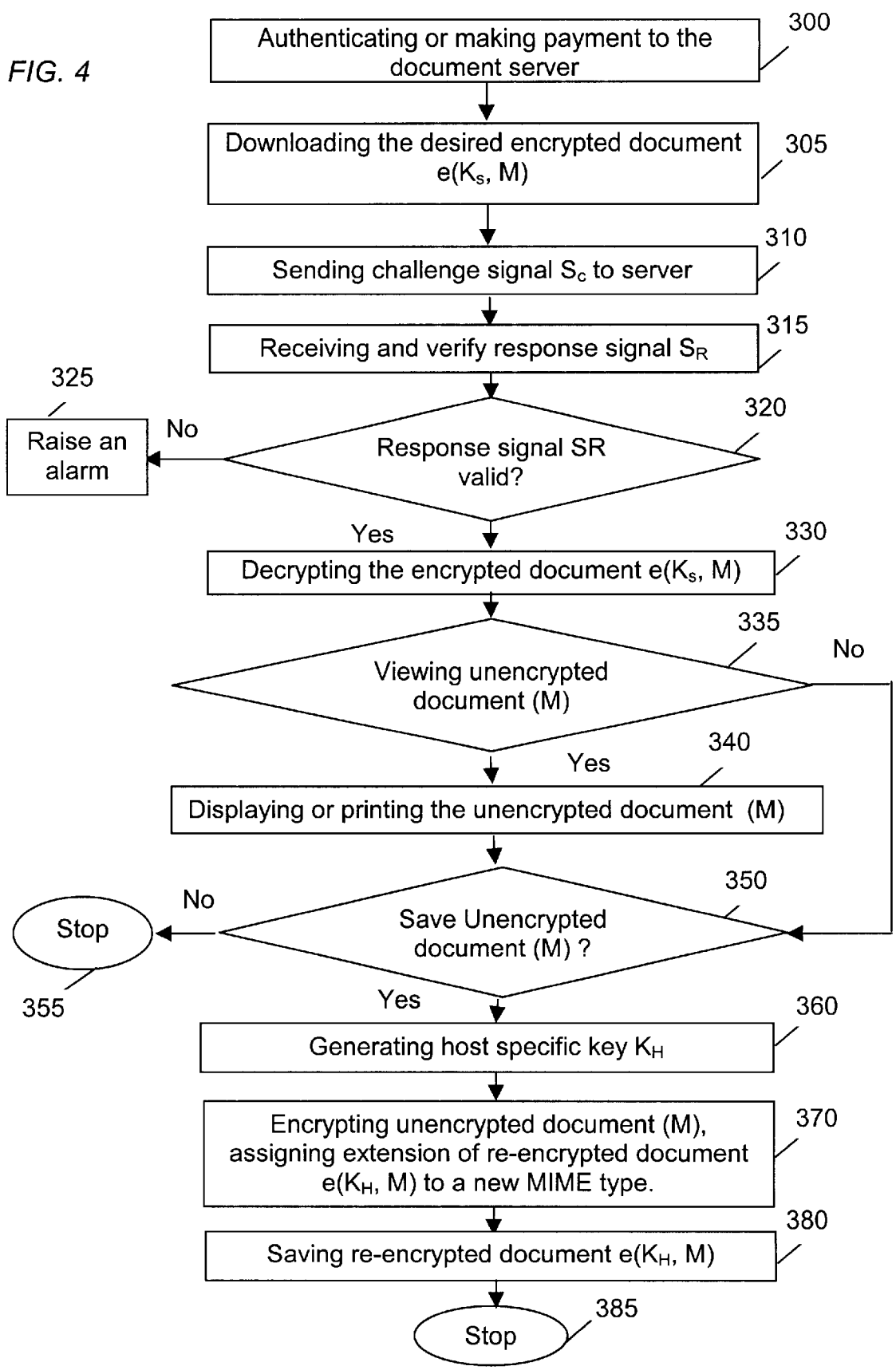
FIG. 4 is a flowchart of the operation of the CPDR module of FIG. 3 when downloading, processing and protecting documents.

FIG. 4 is a flowchart illustrating the operation of the CPDR module 200 when downloading and protecting a document from the server 12. Without loss of generality, a user of the client 16 is assumed to access the server 12 using a web browser. At step 300, the client 16 authenticates itself or makes a payment to the server 12 using protocols well-known in the art. The client 16 then starts downloading a desired encrypted document, say $e(K_S, M)$, at step 305. According to the file extension field, the server 12 sends to the client 16 the MIME type followed by the encrypted document $e(K_S, M)$. After receiving the MIME type and the encrypted document $e(K_S, M)$, the web browser at the client 16 loads the CPDR module 200 that supports the above MIME type document and starts the CPDR module 200 program. From this point on, the CPDR module 200 takes over the responsibility of processing and protecting the encrypted document $e(K_S, M)$. To prevent unauthorised access of the encrypted document $e(K_S, M)$, setting up a web server and distributing the encrypted document $e(K_S, M)$, the CPDR module at step 310 sends a challenge signal $S_c$ to the server 12. Examples of challenge signals are random numbers and time stamps. After getting the challenge signal $S_c$, the server 12 computes a response signal $S_R$ based on the challenge signal $S_c$ and the challenge secret key $K_C$, say $S_R = h(K_C|S_c)$ using a one-way hash function.

At step 315 in the flowchart of FIG. 4, the CPDR module 200 receives the response signal $S_R$ from the server 12 and verifies the response signal $S_R$ based on the challenge signal $S_C$ and the challenge secret key $K_C$. Next, the CPDR module 200 decides if the response signal $S_R$ is valid at step 320. If the response signal $S_R$ is not valid, the CPDR module 200 erases the encrypted document $e(K_S, M)$ and raises an alarm at step 325. If the response signal $S_R$ is valid, the CPDR module 200 decrypts document $e(K_S, M)$ at step 330 using the secret key $K_S$ stored in the key generator 210. At step 335, the user is prompted whether to view or to print the unencrypted document 'M'. If the answer is yes, the document is displayed or printed at step 340. If the answer is no, or after finishing printing or viewing the document, the CPDR module 200 at step 350 queries the user whether he/she wants to save the unencrypted document 'M'. If the answer is no, the ciphertext document $e(K_S, M)$ and the plaintext unencrypted document 'M' are erased from the memory and the operation of the CPDR module 200 is stopped at step 355.

However if, the answer from the user to the query in step 350 is yes, the CPDR module 200 at step 360 instructs the key generator 210 to read the host identification information Host_ID of the client 16 and generates the host specific key $K_H$. The CPDR module 200 then at step 370 encrypts unencrypted document M using host specific key $K_H$ and a symmetric key cryptosystem to obtain $e(K_H, M)$ and assigns the file name of the encrypted document an extension field corresponding to the MIME type supported by the CPDR module 200. Finally, at step 380, the re-encrypted document $e(K_H, M)$ is saved and the downloaded ciphertext encrypted document $e(K_S, M)$ and the plaintext unencrypted document M are erased from the memory. The CPDR module 200 only allows documents encrypted with the host specific key $K_H$ to be saved.

Figure 5:
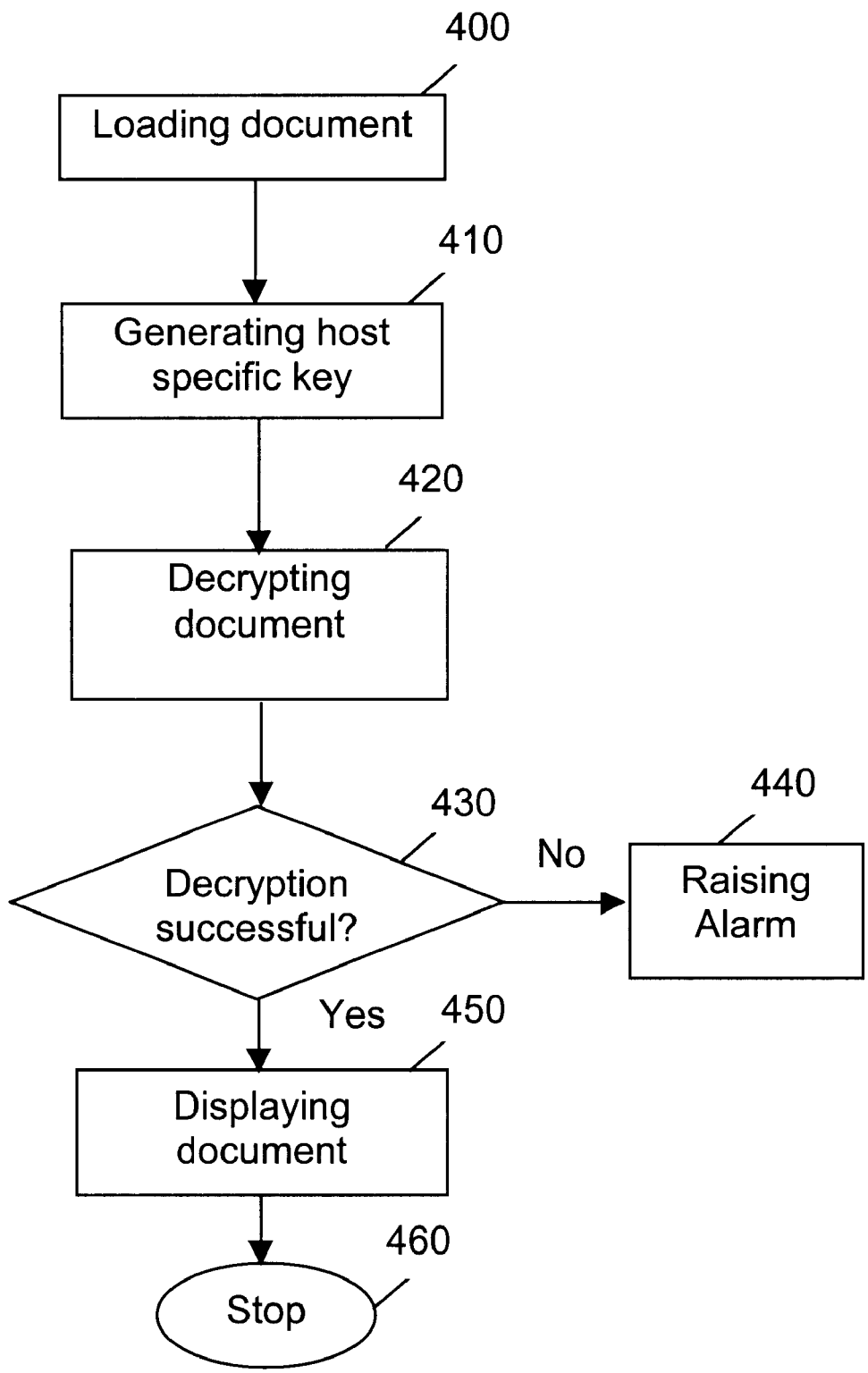
FIG. 5 is a flowchart of the operation of the CPDR module of FIG. 3 when viewing a copy protected document.

FIG. 5 shows a flowchart of the operation of the client 16 when viewing a locally stored copy protected document using the CPDR module 200. At step 400, the CPDR module 200 loads a locally stored document, say $e(K_H, M)$. At step 410, the CPDR module 200 instructs the key generator 210 to read in the client 16 Host_ID, and computes the host specific key:

$K_H = h(\text{Reader\_Secret}|\text{Host\_ID})$.

The re-encrypted document $e(K_H, M)$ is decrypted using host specific key $K_H$ and a symmetric key cryptosystem at step 420. At step 430, the CPDR module 200 checks whether decryption is successful. If the decryption was successful only if the newly generated host specific key $K_H$ is identical to that used to produce $e(K_H, M)$, which in turn implies that the Host_ID and the Reader_Secret are both correct. If the decryption was not successful, the CPDR module 200 raises an alarm at step 440. Otherwise, if the decryption is successful, a decrypted document is displayed at step 450. The Host_ID, host specific key, $K_H$, and plaintext documents are erased from memory as soon as they are no longer in use.

The server 12 may issue new versions of the CPDR module 200, periodically or otherwise, for security reasons. A new version of the CPDR module 200 contains a new set of secret values $K_S$, Reader_Secret and challenge secret key $K_C$ so that a compromised CPDR module 200 that is previously issued is not able to read or to access documents protected by future versions of the CPDR module 200. At the same time, it is highly desirable that documents protected by past versions of the CPDR module 200 be readable or accessible by newer versions of the CPDR module 200. In order to meet this requirement, the Reader_Secret values in different versions of the CPDR module 200 are related as follows.

A positive integer N is the total number of versions of the CPDR module 200 to be issued by the server 12. Let $X_N$ be a secret value and f( ) be a one-way hash function. The Reader_Secret value to be embedded in the nth version of CPDR is $X_n = f(X_{n+1})$, n=N−1, N−2, ..., 2, 1. The nth version of the CPDR module 200 embeds new values for the secret key $K_S$, Reader_Secret=$X_n$, and the challenge secret key $K_C$ (note that $K_S$ and $K_C$ can be chosen randomly). In addition, such an nth version also includes the version number n. The server 12 releases the CPDR module 200 starting from version 1, then version 2, ..., up to version N.

For different versions of the CPDR module 200, all the operations in FIG. 2 and FIG. 4 remain the same as earlier. However, the saved re-encrypted document $e(K_H, M)$, in step 370 and step 380 of FIG. 4 include a header indicating the version number n of the CPDR module 200.

Figure 6:
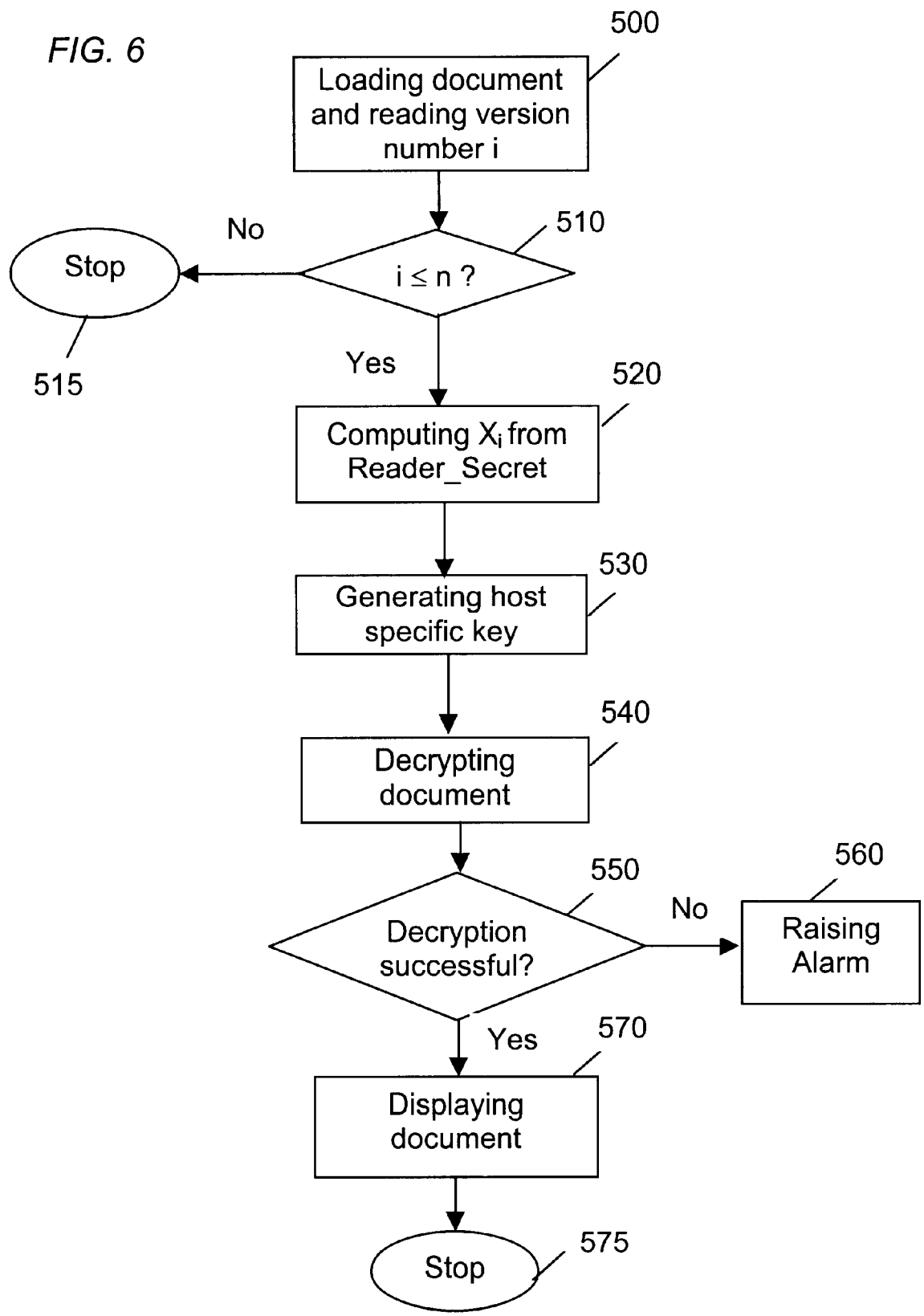
FIG. 6 is a flowchart of the operation of the client of FIG. 1 using an nth version of the CPDR module of FIG. 3 for viewing a copy-protected document.

FIG. 6 shows a flowchart of the operation of the client 16 using the nth version of the CPDR module 200 in viewing a locally stored copy-protected document. At step 500, a locally saved copy-protected document, say $e(K_H, M)$, is loaded and the version number i of the CPDR module 200 used to encrypt the document is read. The CPDR module 200 then checks if i is less than or equal to n, the version number of the CPDR module 200 in use. If the answer is no, the process terminates. If the answer is yes, the CPDR module 200 computes $X_{n-1} = f(\text{Reader\_Secret} = X_n)$, $X_{n-2} = f(X_{n-1})$, ..., $X_i = f(X_{i+1})$ at step 520. The CPDR module 200 at step 530 then reads the client 16 Host_ID and generates a host specific key $K_H = h(X_i|\text{Host\_ID})$. The CPDR module 200 decrypts the document at step 540 and checks whether the decryption is successful at step 550. If the decryption fails, an alarm is raised at step 560. If the decryption is successful, the document is displayed at step 570. The CPDR module 200 erases Host_ID, the decrypted document, $K_H$, $X_{n-1}$, $X_{n-2}$, ..., and $X_i$ from memory before stopping at step 575.

Figure 7:
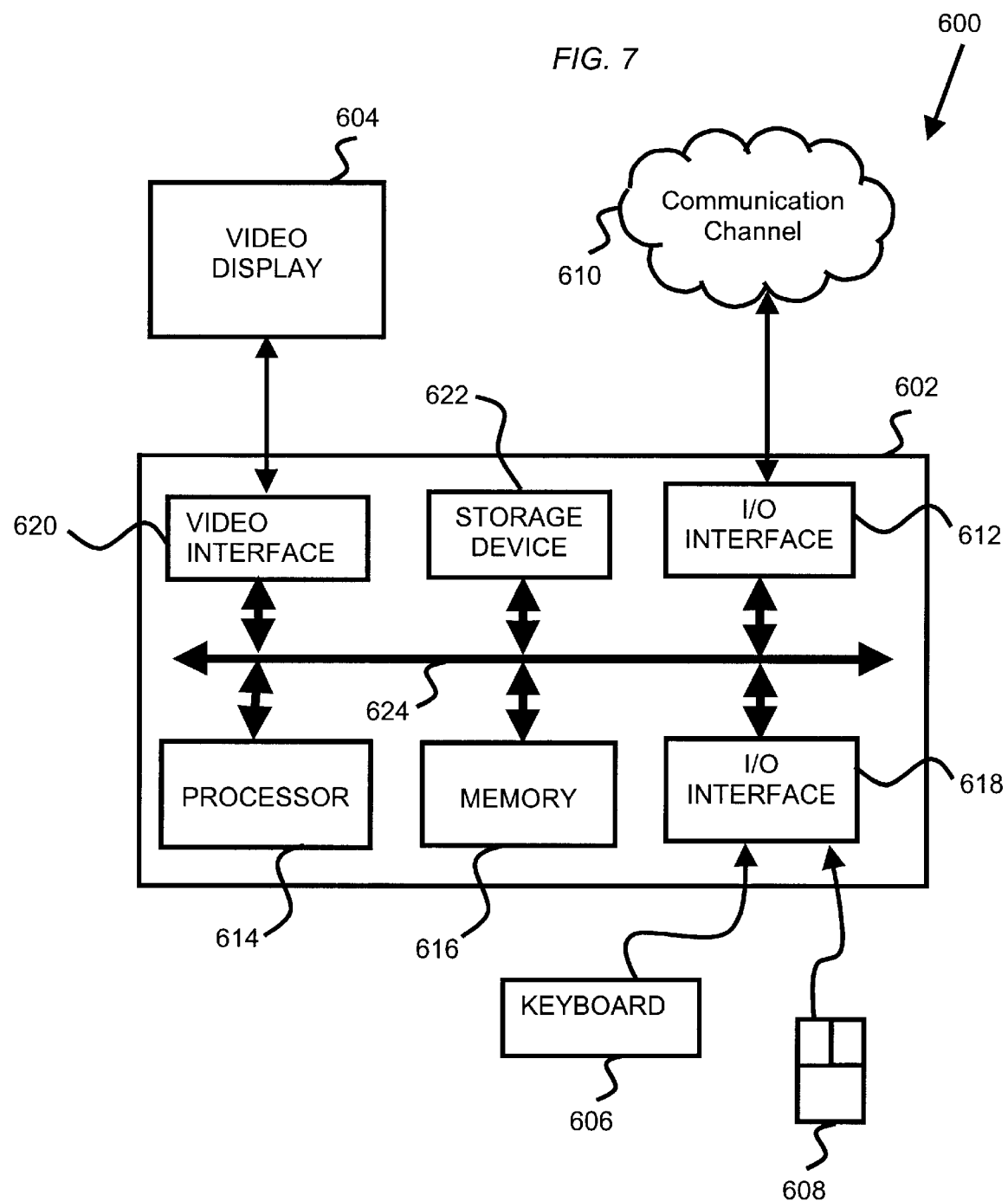
FIG. 7 is a block diagram of an example of a computer system in which the embodiments can be applied.

As described hereinbefore, the embodiments of the invention can be implemented using, for example, a computer system 600 shown in FIG. 7. In particular, the CPDR module 200 can be implemented as software, or a computer program, executing on the computer system 600. The method steps for copy protecting encrypted documents are effected by instructions in the software that are carried out by the computer system 600. Again, the software may be implemented as one or more modules for implementing the method steps. That is, the CPDR module can be a part of a computer program that usually performs a particular function or related functions.

In particular, the software may be stored in a computer readable medium, including the storage devices described hereinafter. The software is loaded into the computer system 600 from the computer readable medium and then the computer system 600 carries out its operations. A computer program product includes a computer readable medium having such software or a computer program recorded on it that can be carried out by the computer system 600. The use of the computer program product in the computer system 600 preferably effects advantageous apparatuses for copy protecting encrypted documents in accordance with the embodiments of the invention.

The computer system 600 includes a computer 602, a video display 604, and input devices 606, 608. In addition, the computer system 600 can have any of a number of other output devices including line printers, laser printers, plotters, and other reproduction devices connected to the computer 602. The computer system 600 can be connected to one or more other computers via a communication interface 612 using an appropriate communication channel 610 such as a modem communications path, an electronic network, or the like. The network may include a local area network (LAN), a wide area network (WAN), an Intranet, and/or the Internet.

The computer 602 includes: a central processing unit(s) (simply referred to as a processor hereinafter) 614, a memory 616 that may include random access memory (RAM) and read-only memory (ROM), input/output (1I0) interfaces 612 and 618, a video interface 620, and one or more storage devices generally represented by a block storage device 622 in FIG. 7. The storage device 622 can consist of one or more of the following: a floppy disk, a hard disk drive, a magneto-optical disk drive, CD-ROM, magnetic tape or any other of a number of non-volatile storage devices well known to those skilled in the art.

Each of the components 612 to 622 is typically connected to one or more of the other devices via a bus 624 that in turn can consist of data, address, and control buses.

The video interface 620 is connected to the video display 604 and provides video signals from the computer 602 for display on the video display 604. User input to operate the computer 602 can be provided by one or more input devices via the interface 618. For example, an operator can use the keyboard 606 and/or a pointing device such as the mouse 608 to provide input to the computer 602.

The computer system 600 is simply provided for illustrative purposes and other configurations can be employed without departing from the scope and spirit of the invention. The foregoing is merely exemplary of the types of computers with which the embodiments of the invention may be practiced. Typically, the processes of the embodiments are resident as software or a program recorded on a hard disk drive (generally depicted as storage device 622 in FIG. 7) as the computer readable medium, and read and controlled using the processor 614. Intermediate storage of the program and media content data and any data fetched from the network may be accomplished using the memory 616, possibly in concert with the storage device 622.

In some instances, the program may be supplied to the user encoded on a CD-ROM or a floppy disk (both generally depicted by the storage device 622), or alternatively could be read by the user from the network via a modem device connected to the computer, for example. Still further, the computer system 600 can load the software from other computer readable medium. This may include magnetic tape, a ROM or integrated circuit, a magneto-optical disk, a radio or infra-red transmission channel between the computer and another device, a computer readable card such as a PCMCIA card, and the Internet and Intranets including email transmissions and information recorded on web sites and the like. The foregoing is merely exemplary of relevant computer readable mediums. Other computer readable mediums may be practiced without departing from the scope and spirit of the invention.

Security Considerations

Symmetric or public key cryptosystems are used in the above embodiment to encrypt plain text documents. Importantly, all encryptions are secure in protecting confidentiality of the documents and are not susceptible to data modifications such as editing cuts or pastes.

Unauthorised personnel may try to violate the copy protection scheme at various points of the client-server system. If such personnel get a legitimate copy of the CPDR module 200 software and are able to access documents encrypted using the secret key $K_S$ (e.g., $e(K_S, M)$), then the plain text document M can be decrypted from the encrypted document $e(K_S, M)$ using the CPDR module 200. To deter unauthorised accessing of documents from the server 12, a user must authenticate himself/herself to the server 12 or must make an electronic payment to the server 12 to purchase the documents. Where eavesdropping or interception is a concern, the transmission channel 14 between the client 16 and the server 12 should be secured with a communications security protocol such as the Secure Socket Protocol (SSL). The above possible violations assume access to the server 12 or the transmission channel 14.

Another possible violation is to move copy-protected documents (e.g., $e(K_H, M)$) from one client 16 to another client 16. However, decryption of a re-encrypted document $e(K_H, M)$ the new client 16 will fail. This is because the host specific key $K_H$ generated by the CPDR module 200 in the new client 16 is different from that used to encrypt the re-encrypted $e(K_H, M)$ document. Knowing the Host_ID of a client 16, and trying to guess the corresponding host specific key $K_H$=h(Host_ID|Reader_Secret) is extremely difficult without the knowledge of Reader_Secret, embedded in and protected by the CPDR module 200.

Yet another possible violation is for an unauthorised person to first register at the server 12 as a legitimate user, replace the CPDR module 200 with his own plug-in software that allows him to save documents (i.e., $e(K_S, M)$) downloaded from the server 12 to his own storage device. Such an unauthorised person can then set up a web server and sell or distribute these documents. To prevent this unauthorised use, the CPDR module 200 in steps 310 and 315 FIG. 4 authenticates the server 12 by sending the challenge signal $S_C$ to and then verifying the response signal $S_R$ from the server 12. Thus, only legitimate servers 12 can reply with valid responses.

It is highly desirable that a digital document copy protection system of a client-server system meets the following requirements:

1) Only authorised users can access encrypted documents from designated clients or servers.
2) Such servers only need to prepare an unencrypted document M once and the same document M is sent to all authorized users;
3) The copy protection system should use existing or standard hardware.
4) If the secret keys of the CPDR module 200 is obtained fraudulently, then a different version of software in the CPDR module 200 can be provided. Such a different version can view previously encrypted document. However, any version fraudulently obtained cannot view documents encrypted with the different version. This prevents unauthorised reading of documents encrypted with the different version.

The client-server system as described in the above embodiments of the invention advantageously meet these requirements to thereby overcome or at least alleviate one or more disadvantages of conventional systems.

In the foregoing description, a method, an apparatus and a computer program product for copy protecting encrypted documents in a client-server system using an unsecured communication channel are disclosed. Only a small number of embodiments are described. However, it will be apparent to one skilled in the art in view of these embodiments that numerous changes and/or modifications can be made without departing from the scope and spirit of the invention.

What is claimed is:

1. A method for copy protecting encrypted documents in a client server system using an unsecured communication channel said client server system having at least one client and at least one server for storing encrypted documents, said method including the steps of:

receiving an encrypted document from said server by a client;

authenticating communications between said client and said server;

decrypting by said client said encrypted document using a decryption key when said step of authenticating is successful to derive a decrypted document;

preventing storage of said decrypted document on a storage device at any of said at least one client;

in response to a user request at said client to save said decrypted document, encrypting said decrypted document with a host specific key associated with said client to provide a re-encrypted document;

saving said re-encrypted document in a storage device of said client;

selecting, by said at least one server for a positive integer N, a random secret value $X_N$;

computing $X_n=f(X_{n+1})$, where $1 \leq n < N$ using a one way hash function; and issuing said random secret value $X_N$ to each of said at least one server and embedding $X_n$ into a module of said client in accordance with said selecting step and said computing step.

2. The method as claimed in claim 1, further including the step of displaying said decrypted document.

3. The method as claimed in claim 1, wherein said encrypting step includes the step of generating said host specific key based on host identification information and an embedded secret value.

4. The method as claimed in claim 3, wherein said generating step includes the step of retrieving said host identification information and said embedded secret value from storage within said client.

5. The method as claimed in claim 4, further including the step of displaying said re-encrypted document in response to a user request to display said re-encrypted document.

6. The method as claimed in claim 5, wherein said step of displaying includes the steps of:

generating said host specific key based on said host identification information and said embedded secret value;

retrieving said re-encrypted document from said storage device; and decrypting with said host specific key said re-encrypted document.

7. The method as claimed in claim 1, and further including the step of removing from memory said decrypted document, said host specific key, said host identification information and said embedded secret value.

8. The method as claimed in claim 1, wherein said decrypting step includes the step of applying a symmetric key cryptosystem with a secret key, said secret key being common to both said at least one client and said at least one server.

9. The method as claimed in claim 8, and further including the steps of:

using a symmetric key at said server to encrypt a plain text document to provide said encrypted document;

encrypting said symmetric key at said server using a server public key associated with said client;

decrypting said symmetric key at said client using a client private key; and decrypting said encrypted documents using said symmetric key as said decryption key.

10. The method as claimed in claim 1, wherein said authenticating step includes the steps of:

challenging by said server using a server private key; and in response to said step of challenging, verifying by said client using a server public key associated with said server.

11. An apparatus for copy protecting encrypted documents in a client server system using an unsecured communication channel said client server system having at least one client and at least one server for storing encrypted documents, said apparatus including:

means for receiving an encrypted document from said server by client;

means for authenticating communications between said client and said server;

means for decrypting by said client said encrypted document using a decryption key when said step of authenticating is successful to derive a decrypted document;

means for preventing storage of said decrypted document on a storage device at any of said at least one client;

means for encrypting said decrypted document with a host specific key associated with said client to provide a re-encrypted document;

means for saving said re-encrypted document in a storage device of said client;

means for selecting, by said at least one server for a positive integer N, a random secret value $X_N$;

means for computing $X_n=f(X_{n+1})$, where $1 \leq n < N$ using a one way hash function; and means for issuing said random secret value $X_N$ to each of said at least one server and embedding $X_n$ into a module of said client in accordance with said, selecting step and said computing step.

12. The apparatus as claimed in claim 11, further including means for displaying said decrypted document.

13. The apparatus as claimed in claim 11, wherein said encrypting means includes means for generating said host specific key based on host identification information and an embedded secret value.

14. The apparatus as claimed in claim 13, wherein said generating means includes means for retrieving said host identification information and said embedded secret value from storage within said client.

15. The apparatus as claimed in claim 14, further including means for displaying said re-encrypted document in response to a user request to display said re-encrypted document.

16. The apparatus as claimed in claim 15, wherein said displaying means includes:

means for generating said host specific key based on said host identification information and said embedded secret value;

means for retrieving said re-encrypted document from said storage device; and means for decrypting with said host specific key said re-encrypted document.

17. The apparatus as claimed in claim 11, and further including means for removing from memory said decrypted document, said host specific key, said host identification information and said embedded secret value.

18. The apparatus as claimed in claim 11, wherein said decrypting means includes means for applying a symmetric key cryptosystem with a secret key, said secret key being common to both said at least one client and said at least one server.

19. The apparatus as claimed in claim 18, and further including:
- means for using a symmetric key at said server to encrypt a plain text document to provide said encrypted document;
- means for encrypting said symmetric key at said server using a server public key associated with said client;
- means for decrypting said symmetric key at said client using a client private key; and
- means for decrypting said encrypted documents using said symmetric key as said decryption key.

20. The apparatus as claimed in claim 11, wherein said authenticating means includes:
- means for challenging by said server using a server private key; and
- means for verifying by said client using a server public key associated with said server.

21. A computer program product having a computer usable medium having a computer readable program code means embodied therein for copy protecting encrypted documents in a client server system using an unsecured communication channel said client server system having at least one client and at least one server for storing encrypted documents said computer program product including:
- computer readable program code means for receiving an encrypted document from said server by a client;
- computer readable program code means for authenticating communications between said client and said server;
- computer readable program code means for decrypting by said client said encrypted document using a decryption key when said step of authenticating is successful to derive a decrypted document;
- computer readable program code means for preventing storage of said decrypted document on a storage device at any of said at least one client;
- computer readable program code means for encrypting said decrypted document with a host specific key associated with said client to provide a re-encrypted document;
- computer readable program code means for saving said re-encrypted document in a storage device of said client;
- computer readable program code means for selecting, by said at least one server for a positive integer N, a random secret value $X_N$;
- computer readable program code means for computing $X_n = f(X_{n+1})$, where $1 \leq n < N$ using a one way hash function; and
- computer readable program code means for issuing said random secret value $X_N$ to each of said at least one server and embedding $X_n$ into a module of said client in accordance with said selecting step and said computing step.

22. The computer program product as claimed in claim 21, further including computer readable program code means for displaying said decrypted document.

23. The computer program product as claimed in claim 21, wherein said computer readable program code means for encrypting includes computer readable program code means for generating said host specific key based on host identification information and an embedded secret value.

24. The computer program product as claimed in claim 23, wherein said computer readable program code means for generating includes computer readable program code means for retrieving said host specific key and said embedded secret value from storage within said client.

25. The computer program product as claimed in claim 24, further including computer readable program code means for displaying said re-encrypted document in response to a user request to display said re-encrypted document.

26. The computer program product as claimed in claim 25, wherein said computer readable program code means for displaying includes:
- computer readable program code means for generating said host specific key based on said host identification information and said embedded secret value;
- computer readable program code means for retrieving said re-encrypted document from said storage device; and
- computer readable program code means for decrypting with said host specific key said re-encrypted document.

27. The computer program product as claimed 21, further including computer readable program code means for removing from memory said decrypted document, said host specific key, said host identification information and said embedded secret value.

28. The computer program product as claimed in claim 27, further including:
- computer readable program code means for using a symmetric key at said server to encrypt a plain text document to provide said encrypted document;
- computer readable program code means for encrypting said symmetric key at said server using a server public key associated with said client;
- computer readable program code means for decrypting said symmetric key at said client using a client private key; and
- computer readable program code means for decrypting said encrypted documents using said symmetric key as said decryption key.

29. The computer program product as claimed in claim 21, wherein said computer readable program code means for decrypting includes computer readable program code means for applying a symmetric key cryptosystem with a secret key, said secret key being common to both said at least one client and said at least one server.

30. The computer program product as claimed in claim 21, wherein said computer readable program code means for authenticating includes:
- computer readable program code means for challenging by said server using a server private key; and
- computer readable program code means for verifying by said client using a server public key associated with said server.

* * * * *